Sept. 10, 1968  H. M. BEARD  3,400,484
BAIT HOLDER
Filed Dec. 20, 1966

INVENTOR
HORACE M. BEARD
BY *Rommel, Allwine & Rommel*
ATTORNEYS

United States Patent Office 3,400,484
Patented Sept. 10, 1968

3,400,484
BAIT HOLDER
Horace M. Beard, 209 Ridgewood St.,
Bridge City, Tex. 77611
Filed Dec. 20, 1966, Ser. No. 603,283
2 Claims. (Cl. 43—44.6)

ABSTRACT OF THE DISCLOSURE

A single length of resilient strip material has a curved end portion provided with two adjacent apertures for receiving and frictionally gripping a fishhook shank adjacent the eye thereof. The strip has a curved opposite end portion provided with an elongated slot for straddling the curved end of the fishhook.

---

This invention relates to bait holders or retainers constructed and arranged to be attached to fishhooks.

An important object of this invention is to provide a detachable and attachable bait holder constructed of a single length of resilient material, in strip form, for cooperation with a conventional fishhook shank in order to retain various kinds of bait in good frictional contact with the shank.

Another important object of this invention is to provide a bait holder which presents a flattened surface or face against the bait, in contradistinction to a wire bait holder which tends particularly to sever soft-bodied bait.

Another important object of this invention is to provide a bait holder constructed and arranged to retain various live bait in live, active and uninjured conditions, while retained on fishhooks, for lengthy periods of time.

Still another important object of this invention is to provide a bait holder which is sturdy and remains fixed when in use, may be manufactured at a low cost, and a number of the holders may be packed together and will then provide only a small package.

Other objects and advantages of the invention will be apparent during the course of the following detailed description of the invention, taken in connection with the accompanying drawing, forming a portion of this disclosure, and in which drawing.

Figure 1:
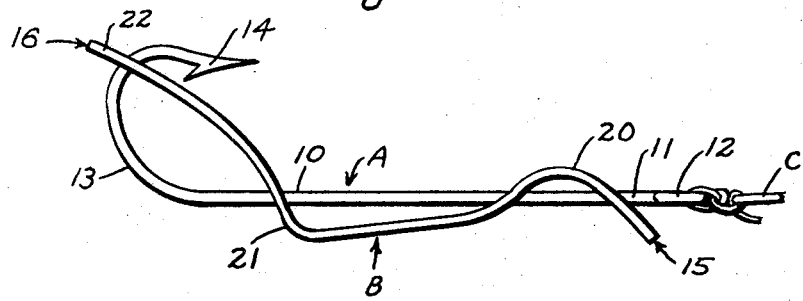
FIG. 1 is a side elevational view of an example of the bait holder of this invention removably attached to a conventional fishhook.

In the drawing, wherein for the purpose of illustration is shown a preferred embodiment of the invention and wherein similar reference characters designate corresponding parts throughout the several views, the letter A may designate a conventional fishhook; B, the bait holder; C, a fishline and D, bait carried by the bait holder B and fishhook A.

The fishhook A includes a somewhat J-shaped shank 10, with the substantially straight portion 11 thereof ending, at its free end, in an eye 12, and its curved portion 13 thereof ending in a barb 14. The periphery of the shank 10 is generally circular.

For the bait holder B, I employ a single strip or length of resilient material, which is preferably of metal, as spring steel, or a springy plastic material. The strip has substantially parallel side edges and substantially parallel end edges 15 and 16, with the end edge 15 being termed, for convenience, the upper end edge. The overall length of the strip may be, by way of example, 3 inches and its width ⅛ inch. Preferably, a short distance from the upper end edge 15 is a first small opening 17 and, spaced a short distance (as ½ inch) from the opening 17, is a second small opening 18. The openings 17 and 18 are preferably round perforations of diameters slightly greater than the diameter of the shank 10, as may be seen in FIG. 4, and slightly greater than the width of the barb 14. Spaced from the opening 18 (about ¾ inch, for example) is an elongated narrow slot 19 which ends adjacent the end edge 16. The slot may be, by way of example, 1/16 inch wide (or a width sufficient to permit the bait holder to be slipped over the barb 14).

Figure 2:
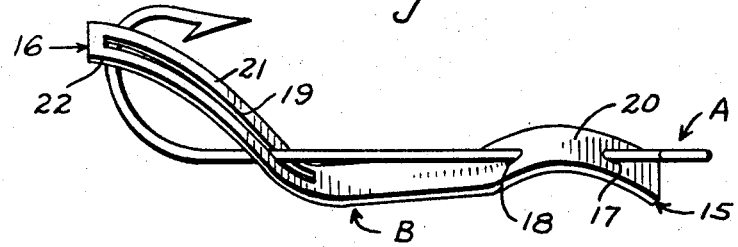
FIG. 2 is a respective view, along the lines of FIG. 1, but with the bait holder partly separated from the fishhook and rotated thereabout.
Figure 3:
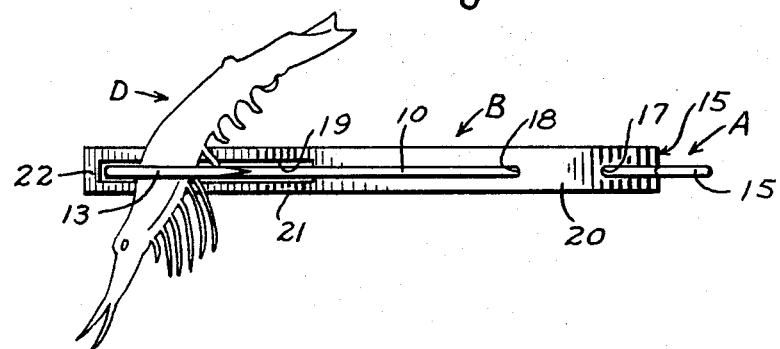
FIG. 3 is a plan view of the hook and bait holder of FIGS. 1 and 2, but with bait in place on the fishhook.
Figure 4:
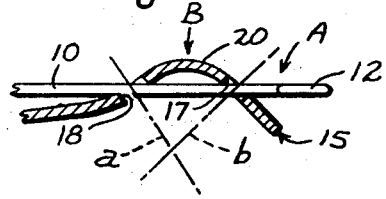
FIG. 4 is an enlarged fragmentary view, partly in elevation and partly in vertical section of the upper end portions of the fishhook and bait holder of FIGS. 1–3.

The strip just described is fashioned, as by bending or molding, into a somewhat S-shaped (in longitudinal section) bait holder B, comprising an upper or minor curved portion 20 which includes the openings 17 and 18, as may be seen particularly in FIG. 4, where it is shown that the axes $a$ and $b$ of the perforations intersect. This is important, as will be subsequently explained. From the inner end of the minor curved portion 20 is a major curved portion 21 which includes the slot 19, and a terminal portion 22 which is a reverse curve substantially as shown in FIGS. 1–3. This portion 22, cooperating with the curved portion 13 of the fishhook A, provides the bait-contacting elements, with the barb 14 outwardly of the bait holder B, and facing one face of the latter, and also provides a finger grip, as will be subsequently described. This same FIG. 4 shows how the upper extremity of the minor curved portion 20 extends away from the eye 12 of the fishhook A, so as not to interfere with the line C.

The bait holder B may be readily connected to or removed from the fishhook A by grasping the terminal portion 22 and moving it toward and over the barb 14, rotating the former through substantially 90° of an arc, and slipping the entire bait holder downwardly and off the fishhook. The resiliency of the material of the bait holder will permit this, and it can be rethreaded onto the fishhook by reversing the steps.

The bait D may be inserted between the fishhook shank 10 and the bait holder strip, to appear substantially as in FIG. 3, with one face of the strip contacting the bait.

Referring to FIG. 4, it will be seen that there is a multiple spring contact of the strip with the periphery of the fishhook shank, thus preventing accidental slippage of the bait holder along the fishhook shank, yet there is no fixed nor integral connection of the fishhook and bait holder.

What is claimed is:

1. A bait holder for conventional fishhooks comprising a single strip of resilient material formed with reversely curved end portions and having a generally S-shape in longitudinal section, one of said curved end portions being provided with two adjacent perforations having their axes intersecting and their edges constructed and arranged to grip a fishhook shank, the other of said curved end portions including a terminal portion reversely curved with respect thereto, and an elongate slot, extending from adjacent one of said perforations, longitudinally of said strip to adjacent the terminal edge of said other curved end portion, whereby said other curved end portion of said strip may straddle the curved end portion of said fishhook shank with one of the faces of said strip facing said curved end portion of said shank and the other face of said strip facing the barb extending from said curved end portion of said shank.

2. A bait holder according to claim 1 characterized in that said other curved end portion of said strip is provided with a finger-gripping portion, whereby said other curved end portion may be pulled from its straddling position with respect to said curved end portion of said fishhook shank, said bait holder rotated substantially 90° and said bait holder slid from said fishhook.

References Cited

UNITED STATES PATENTS

| | | | |
|---|---|---|---|
| 808,239 | 12/1905 | Homan | 43—42.43 |
| 2,090,571 | 8/1937 | Coffin | 43—43.4 |
| 2,615,277 | 10/1952 | Hayden | 43—43.2 |
| 3,040,466 | 6/1962 | Jablonski | 43—42.38 X |

WARNER H. CAMP, *Primary Examiner.*